United States Patent
Fujimura et al.

[11] Patent Number: 6,033,001
[45] Date of Patent: Mar. 7, 2000

[54] WHEEL FOR ROLLING STOCK AND MANUFACTURING METHOD THEREOF

[75] Inventors: Takashi Fujimura; Yoshinori Okagata, both of Osaka, Japan

[73] Assignee: Sumitomo Metal Industries Limited, Osaka, Japan

[21] Appl. No.: 08/950,789

[22] Filed: Oct. 15, 1997

[30] Foreign Application Priority Data

Oct. 18, 1996 [JP] Japan .................................. 8-297173

[51] Int. Cl.[7] .................................................. B60B 37/00
[52] U.S. Cl. ....................... 295/21; 148/583; 29/894.01
[58] Field of Search ............................. 295/1, 21, 8, 27; 148/583; 29/894.01

[56] References Cited

U.S. PATENT DOCUMENTS

| | | | |
|---|---|---|---|
| 757,819 | 4/1904 | Loss | 29/894.01 |
| 806,580 | 12/1905 | Scitoen | 29/894.01 |
| 1,833,201 | 11/1931 | Bell | 29/894.01 |
| 2,103,834 | 12/1937 | Tyson | 295/27 X |
| 2,129,671 | 9/1938 | Brunner | 148/583 |
| 3,038,755 | 6/1962 | Keysor | 295/21 |
| 4,471,990 | 9/1984 | Hirakawa et al. | 295/21 |
| 5,039,152 | 8/1991 | Esaulov et al. | 295/21 |

FOREIGN PATENT DOCUMENTS 56-34504   4/1981   Japan .

*Primary Examiner*—Russell D. Stormer
*Attorney, Agent, or Firm*—Burns, Doane, Swecker & Mathis, LLP

[57] ABSTRACT

A wheel for rolling stock in which when a deflection amount λ of a disk relative to a rim section is set to not less than 5 mm, a condition that a deflection amount δ of the rim section relative a boss section ≧40 mm is secured easily, an excellent durability against cracking damage can be obtained.

5 Claims, 15 Drawing Sheets

WHEEL FOR ROLLING STOCK AND MANUFACTURING METHOD THEREOF

BACKGROUND OF THE INVENTION

The present invention relates to an improvement of a wheel for rolling stock having such a form that a rim section is deflected from a boss section towards the outside of a track and relates to a manufacturing method thereof.

A wheel for rolling stock (hereinafter, referred to as a wheel) requires a performance against a cracking damage due to a thermal crack occurring on a tread or flange surface of the wheel, namely, requires durability against cracking damage, because of a thermal stress due to mainly brake heat under such a circumstance that the brake heat is raised in response to recent increase in high-speed travel via railroad.

As a conventional technique which satisfies the above requirement, there exist a method of decreasing heat sensitivity of a material or improving fracture toughness, and a method of decreasing a thermal stress generated by braking, etc. due to improvement in a form of a wheel. As a technique which belongs to the latter method, the applicant of the present invention has suggested a wheel for rolling stock in Japanese Patent Application Laid-Open No. 56-34504 (1981).

FIG. 1 is an explanatory drawing showing a deflection amount $\delta$ and deflection angle $\theta$ of a rim section 1 relative to a boss section 3 in a solid rolled wheel for rolling stock (hereinafter, referred to as a solid rolled wheel). In the wheel disclosed in Japanese Patent Application Laid-Open No. 56-34504 (1981), as shown in FIG. 1, an end of a curved line of the side of a fillet closer to a flange 2 of the rim section 1 of the wheel is a point A1, a position on the side opposed to the flange where a plate thickness of a wheel disk wheel disk section 4 is minimum relative to the point A1 is a point A2, and a mid-point between the points A1 and A2 is a point A3. Similarly, an end of a curved line on a side opposed to the flange of the fillet of the boss section 3 is a point B1, a position on the side closer to the flange where the plate thickness is minimum relative to the point B1 is point B2, and a mid-point between the points B1 and B2 is a point B3. Lines from the points A3 and B3, which are perpendicular to a center line O of the wheel, are represented by La and Lb respectively, and a dimension between the lines La and Lb, namely, a deflection amount of the rim section 1 is represented by $\delta$, and an angle between a line linking the points A3 and B3 and the line La or Lb, namely, a deflection angle of the wheel disk section 4 is represented by $\theta$. At this time, in the case where any wheel whose diameter is equivalent to the above one is used, there is a tendency that as the deflection amount $\delta$ is larger, the thermal stress which is generated in the wheel disk section 4 of the wheel is smaller.

Needless to say, when the deflection amount $\delta$ changes, the deflection angle $\theta$ also changes simultaneously. For this reason, the similar change is shown as to action of the thermal stress of the wheel disk section 4 with respect to the deflection angle $\theta$. A relationship between the deflection amount $\delta$ and the maximum value of the thermal stress in the wheel disk section 4 is shown in FIG. 2. According to this result, when the deflection amount $\delta \geq 40$ mm, the thermal stress generated at the time of braking can be lowered remarkably, and a wheel having excellent brake-resistance performance can be obtained. Here, since the relationship between the deflection angle $\theta$ and the maximum value of the thermal stress of the wheel disk section 4 is approximately the same as the relationship between the deflection amount $\delta$ and the maximum value of the thermal stress of the wheel disk section 4, the description thereof is omitted.

As mentioned above, the solid rolled wheel of conventional wheels has limitation in the manufacturing technique that the point A3 in FIG. 1 is positioned approximately in the center of an axial direction, parallel to the center line 0, of an inner diameter of the rim section 1. FIG. 3 is an explanatory drawing showing a deflection amount $\lambda$ of the wheel disk section in the solid rolled wheel. As shown in FIG. 3, when a line, which is perpendicular to the center line 0 of the wheel and passes through the point A3 which is the mid-point between the points A1 and A2, is represented by La, and a mid-point in the axial direction of the inner diameter of the rim section 1 is represented by a point C, and a line, which is perpendicular to the center line 0 of the wheel and passes through the point C is represented by Lc, a distance between the lines La and Lc, namely, the deflection amount $\lambda$ is approximately zero. As a result, even if the deflection amount $\lambda$ is made larger in the design, the deflection amount $\lambda$ according to the design cannot be obtained, and only a value of zero or close to zero is obtained in the most cases.

Therefore, in the case of the rolled wheel, it is necessary to satisfy the condition that the deflection amount $\delta \geq 40$ mm with only by the deflection amount of the point B3 in the center of the plate thickness adjacent to the end of the curved line on the side opposed to the flange of the fillet of the boss section 3. For this reason, it is difficult to obtain the condition that the deflection amount $\delta \geq 40$ mm in a wheel for locomotive, etc. having a hub cut and a larger diameter. Moreover, since the deflection amount $\lambda$ is approximately zero, the maximum value of the deflection amount $\delta$ is not so larger, and thus the deflection angle $\theta$ of the wheel disk section 4 shown in FIG. 1 cannot obtain a larger value. As a result, since the occurrence of the thermal stress cannot be sufficiently suppressed, there arose a problem that the durability against a cracking damage cannot be improved more than some degree.

BRIEF SUMMARY OF THE INVENTION

The present invention is invented in order to solve the above problem, and it is an object of the present invention to provide a solid rolled wheel, in which a thermal stress is lowered according to a form of the wheel, and a larger deflection amount $\delta$ is obtained by setting a deflection amount $\lambda$ of a disk, which have been conventionally about 0, to not less than 5 mm, and thus an excellent durability against cracking damage is obtained. The invention also relates to a manufacturing method thereof.

A wheel for rolling stock of the present invention is characterized by including a boss section adapted to be fitted on a wheel set, a disk formed on a circumference of the boss section, and a rim section on an outer circumferential end of the disk, which is deflected to one side in an axial direction from the boss section wherein the disk is deflected to one side in the axial direction from the rim section so that a condition that $\lambda \geq 5$ mm is satisfied where $\lambda$ is a deflection amount which is an axial direction distance between a center of a thickness in the axial direction of the rim section and a center of a thickness in the axial direction of an end of the disk closer to the rim section.

In addition, the wheel for rolling stock of the present invention is characterized in that the rim section is deflected from the boss section so that a condition that $\delta \geq 40$ mm is satisfied where $\delta$ is a deflection amount which is an axial direction distance between a center of a thickness in the axial direction of an end of the disk closer to the rim section and a center of a thickness in the axial direction of an end of the disk closer to the boss section.

Further, the wheel for rolling stock of the present invention is characterized in that the disk is provided with a fillet at an end thereof closer to rim section, and the deflection amount $\lambda$ is an axial direction distance between the center of a thickness in the axial direction of the rim section and a center of a thickness in the axial direction in the vicinity of the end of a curved line farther away from the rim section on the fillet.

Furthermore, the wheel for rolling stock of the present invention is characterized in that the disk is provided with a fillet at an end thereof closer to the boss section, and the deflection amount δ is an axial direction distance between a center of a thickness in the axial direction in the vicinity of the end of a curved line farther away from the rim section on the fillet closer to the rim section and a center of a thickness in the axial direction in the vicinity of the end of a curved line farther away from the boss section on the fillet closer to the boss section.

A method of manufacturing a wheel for rolling stock of the present invention is characterized by including the steps of: forming a boss section to be fitted on a wheel set, a disk formed on a circumference of the boss section and a rim section on an outer circumferential end of the disk by preforging; providing a fillet to an end of the disk closer to the rim section by rolling; and deforming the disk by rotational forging so that conditions that V=W, $R_1=R_3$, $R_2>R_4$ are satisfied.

Here, V is a volume of the disk from an inner circumferential surface of the rim section to the end of a curved line of the fillet after the rolling; W is a volume of the disk from the inner circumferential surface of the rim section to the end of the curved line of the fillet after the rotary forging, $R_1$ is a curvature of a curved line on one side in an axial direction of the fillet after the rolling, $R_2$ is a curvature of a curved line on the other side in the axial direction of the fillet after the rolling, $R_3$ is a curvature of a curved line on one side in the axial direction of the fillet after the rotary forging, and $R_4$ is a curvature of a curved line on the other side in the axial direction of the fillet after the rotary forging.

The inventors understand that when the condition that the deflection amount λ of the rim section ≧5 mm is satisfied in the state that La shown in FIG. 3 is closer to the side opposed to the flange than Lc, the condition that the deflection amount δ of the disk ≧40 mm is secured easily, and thus a wheel having an excellent durability against cracking damage can be obtained.

The above and further objects and features of the invention will more fully be apparent from the following detailed description with accompanying drawings.

BRIEF DESCRIPTION OF THE SEVERAL VIEWS OF DRAWINGS

DETAILED DESCRIPTION OF THE INVENTION

The following details an embodiment of the present invention with reference to the drawings.

Figure 1:
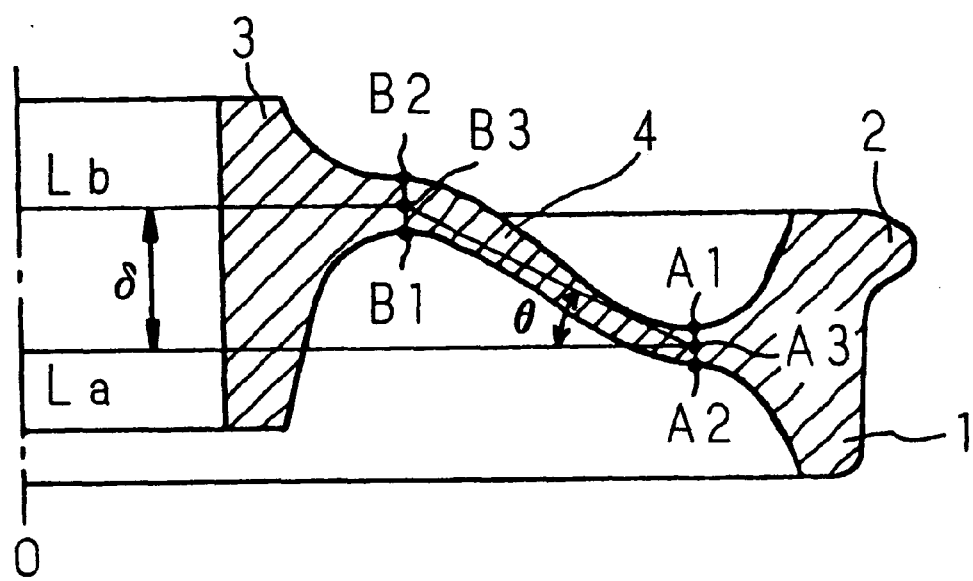
FIG. 1 is an explanatory drawing showing a deflection amount δ and deflection angle θ of prior art rim section in a solid rolled wheel.
Figure 2:
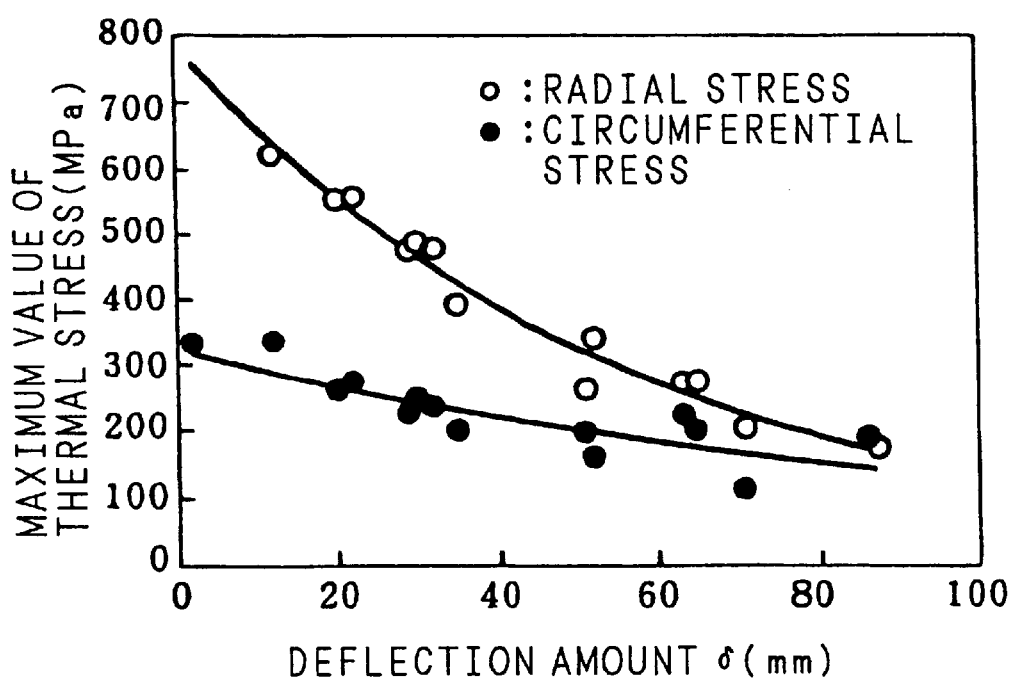
FIG. 2 is a graph showing a relationship between the deflection amount δ and a maximum value of thermal stress of the rim section in the solid rolled wheel of FIG. 1.
Figure 3:
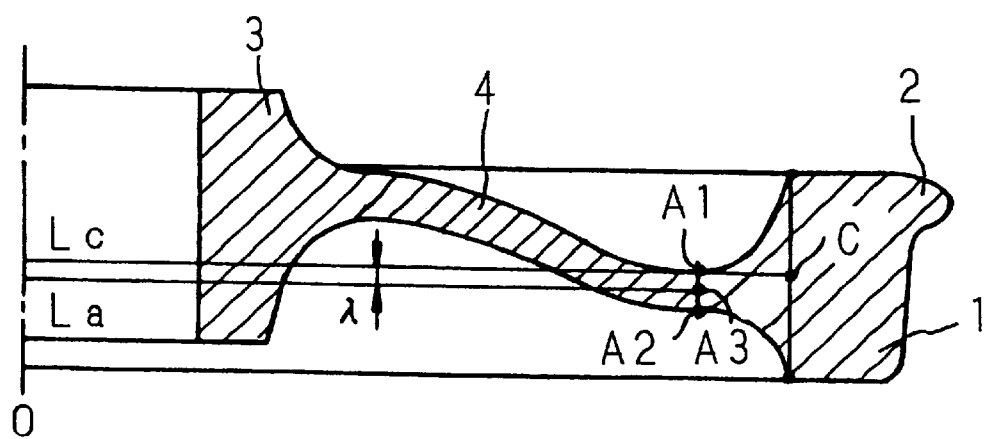
FIG. 3 is an explanatory drawing showing a deflection amount λ of the wheel disk section in a prior art solid rolled wheel.

As is clear from FIG. 2, as a deflection amount δ of a rim section is larger, a thermal stress generated in a wheel disk section 4 of a wheel is weaker, and a condition that the deflection amount δ≧40 mm has been employed as a technique of reducing the thermal stress. In the present embodiment, besides the condition that the deflection amount δ≧40 mm, a condition that a deflection amount λ of the wheel disk section, which was nearly zero in the conventional technique, is set to not less than 5 mm.

The deflection amount λ is set to not less than 5 mm as mentioned above because first, the condition that the deflection amount δ≧40 mm is not easily fulfilled with the deflection amount λ of the wheel disk section being zero in a wheel for a locomotive having hub cut, etc., and even in the case of a wheel in which a value of a deflection angle θ of the wheel disk section is smaller, a form of such a wheel can be designed easily by setting the deflection amount λ to not less than 5 mm.

Figure 4:
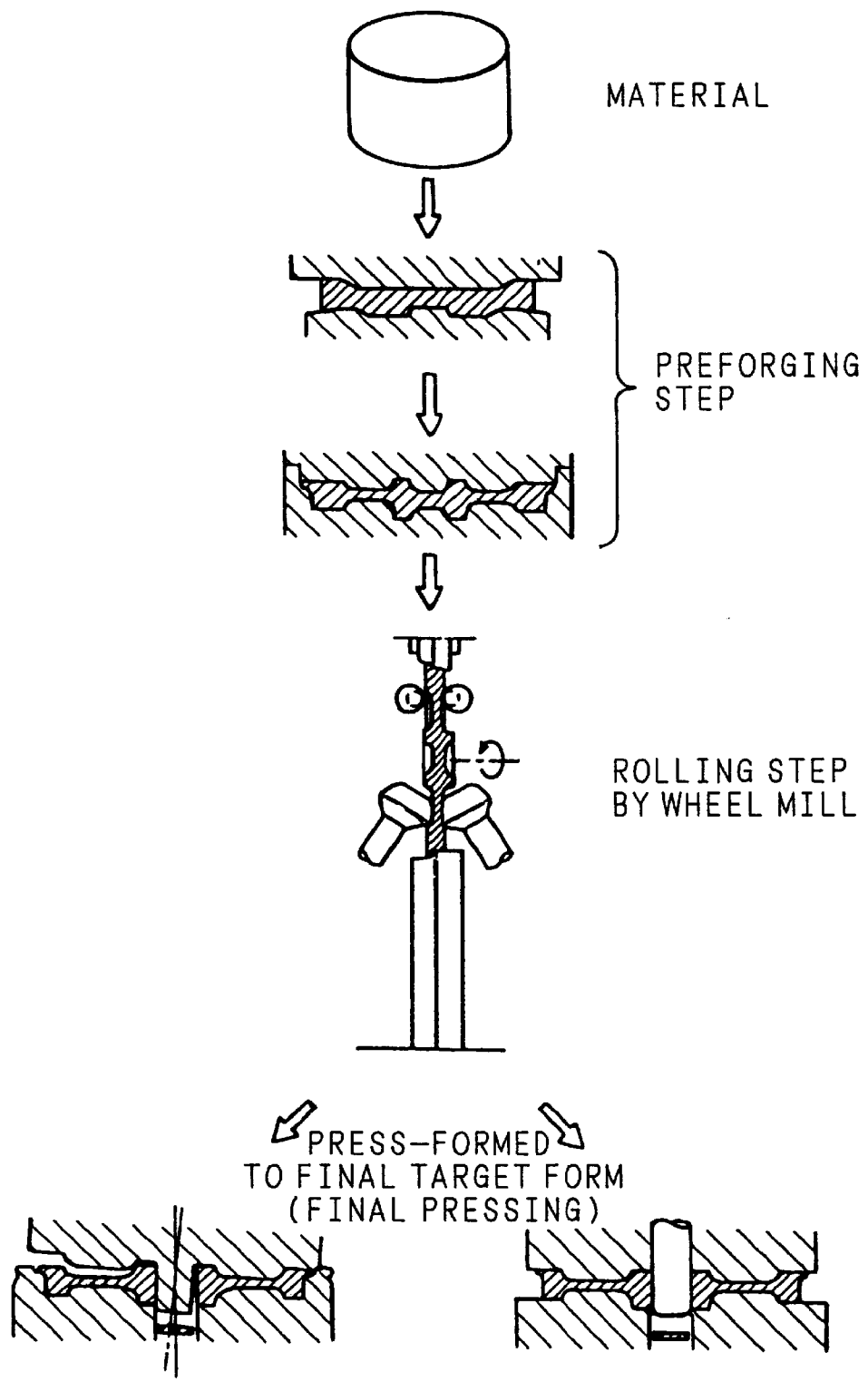
FIG. 4 is an explanatory drawing showing a prior art manufacturing method of making the solid rolled wheel.
Figure 5:
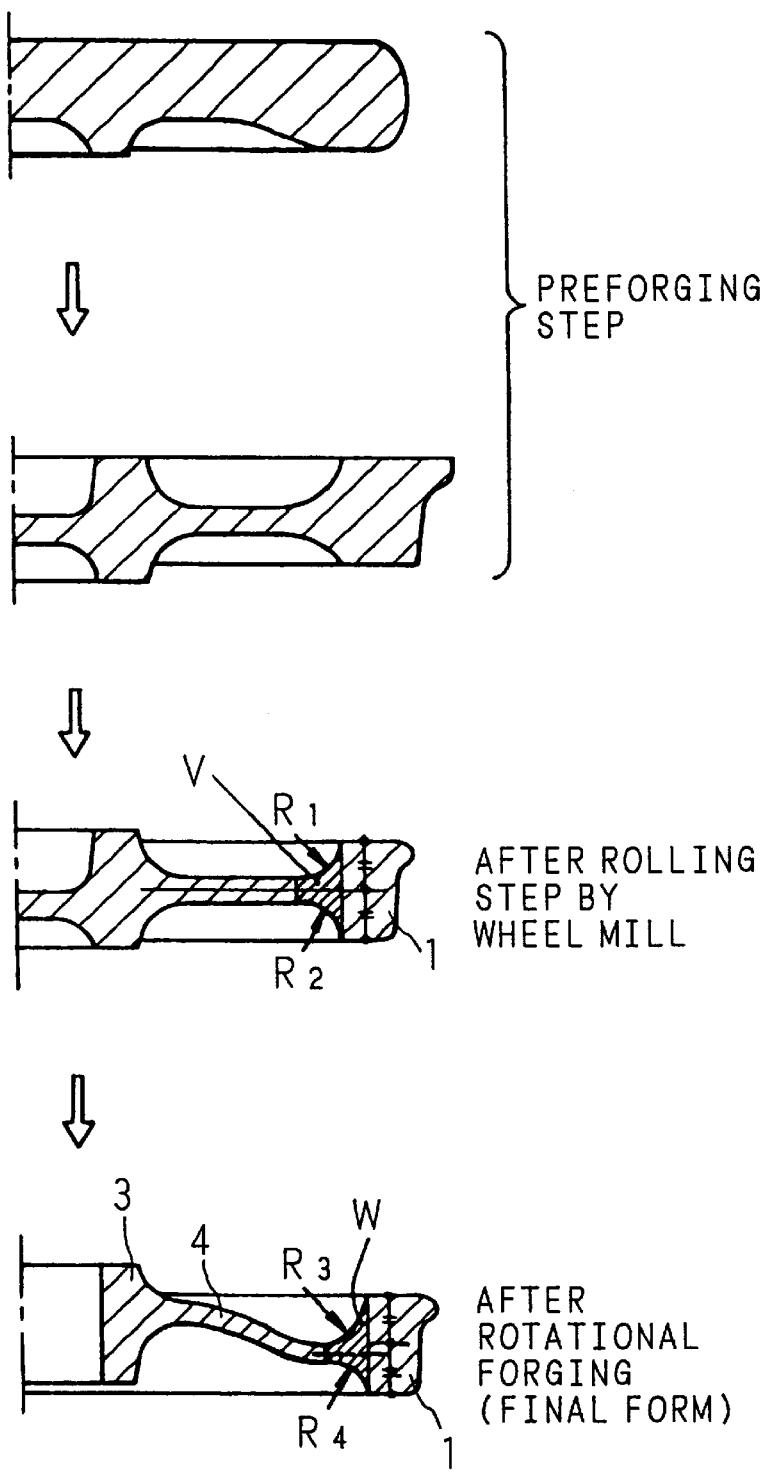
FIG. 5 is an explanatory drawing showing a method of manufacturing the solid rolled wheel of the present invention.

Secondly, a technique of manufacturing a wheel in which the deflection amount λ≧-5 mm is fulfilled is established. In the method of manufacturing the conventional rolled wheel for rolling stock, as shown in FIG. 4, after a material was preforged and rolled, it was press-formed to a final target form. In the first place, in the rolling step by wheel mill, there is a limitation that the deflection amount λ of the wheel disk section 4 is nearly zero, and in the final forming step, a press is generally used. For this reason, in the conventional manufacturing method, it was actually impossible that the deflection amount λ≧5 mm. In the present invention, when the form after the rolling step is designed while setting a condition on a curvature of a fillet of the rim section 1, a technique in which it is made possible that the deflection amount λ≧_5 mm in the finally formed product is established.

In other words, in the steps until the rolling step by wheel mill, the wheel is designed by the manufacturing method similar to the conventional one so that the deflection amount λ of the wheel disk section 4 is zero. Then, in the final forming step, a base on the rim section 1 side is deformed by a rotary forging machine so that a solid wheel in which the deflection amount λ≧5 mm is formed.

At this time, the form design after rolling is important. This depends on a roll design of a mill or a preforming design. As to a volume (rim taper volume) from an end of a curved line of the fillet of the rim section 1 to the inside diameter of the rim section 1 represented by narrow-width slant lines, a volume V after rolling accords with a volume W after final forming, and a curvature $R_1$ of a curved line on the side closer to the flange of the fillet of the rim section 1 accords with a curvature $R_3$ after the final forming, and a curvature $R_2$ of curved line on the side opposed to the flange of the fillet of the rim section 1 is larger than a curvature $R_4$ after the final forming. The form of the wheel is designed as mentioned above.

By designing the form of the wheel after rolling as mentioned above, the deflection amount δ of the rim section 1 obtains a larger value, and the occurrence of the thermal stress can be reduced remarkably, thereby making it possible to obtain a rolling stock having excellent durability against cracking damage.

Figure 6:
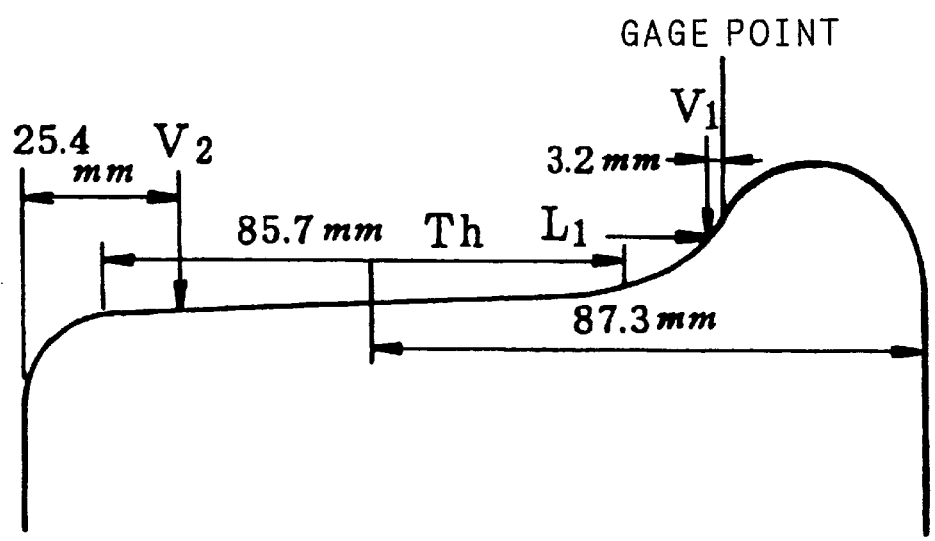
FIG. 6 is an explanatory drawing showing load positions $V_1$, $V_2$ and $L_1$ when a stress analyzing test is performed on the wheel of the present invention and a comparative wheel.

In order to verify the effect of the present invention, the stress analysis test was performed by the finite element method under the condition shown in Table 1 on the solid rolled wheel (the present invention) having a diameter of 1143 mm, the deflection amount δ of the rim section of 64 mm and the deflection amount λ of the wheel disk section of 12 mm (with hub cut), and on a solid rolled wheel (comparative wheel) having a diameter of 1143 mm, the deflection amount δ of the rim section of 52 mm and the deflection amount λ of the wheel disk section of 0 mm (with hub cut). The load positions $V_1$, $V_2$ and $L_1$ at that time are shown in FIG. 6.

In the above analysis, an evaluation was made by comparing the solid rolled wheels having different forms under the same condition in the elasticity analysis as to whether or not the form setting of the wheel is satisfied under the normal use condition. The rim section having a newly manufactured form and the rim section having an abraded form were used. The results are shown in Tables 2 and 3 and FIGS. 7 through 14.

Figure 15:
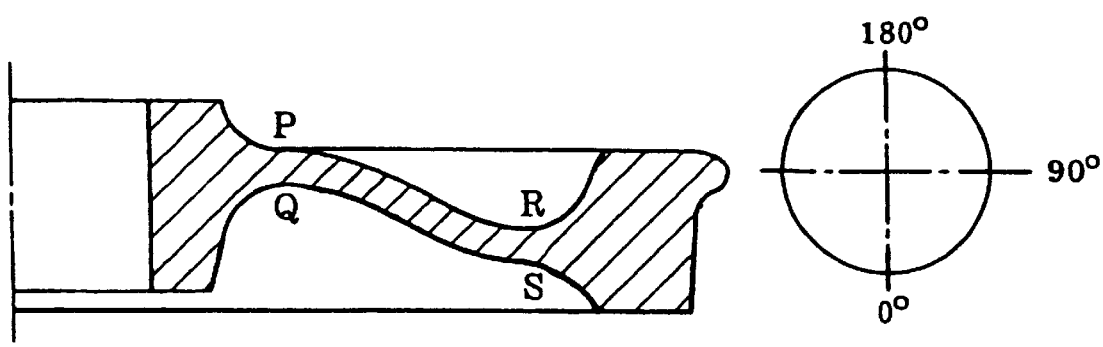
FIG. 15 is an explanatory drawing showing positions P, Q, R and S where a maximum stress of the wheel disk section is measured in the stress analyzing test.

The maximum stress generated in the wheel disk section under each condition is shown in Table 2. This shows the evaluations of thermal expansion of the rim section generated due to a tread brake, tension and compressive stress generated in the wheel disk section by a combination of a normal force due to a rolling stock load and a lateral load at a curvilinear motion. Here, the positions P, Q, R and S of where the maximum stress is measured are shown in FIG. 15.

Under a condition including a thermal load where a brake head is assumed, the maximum stress of the wheel disk section obtains a large tension value, but it is found that the wheel of the present invention has the stress reducing effect of about 15% in the newly manufactured state and of about 40% in the abrasion limit state compared with the conventional wheel. Therefore, it is found that in the wheel of the present invention, the average value of a repeated stress of the wheel disk section due to the brake heat, rolling stock load, etc. is low and the safety factor for the fatigue of the wheel disk section is high. Moreover, under a condition not including the thermal load, the absolute values in both the wheels are small, and thus there arises no problem.

Figure 7:
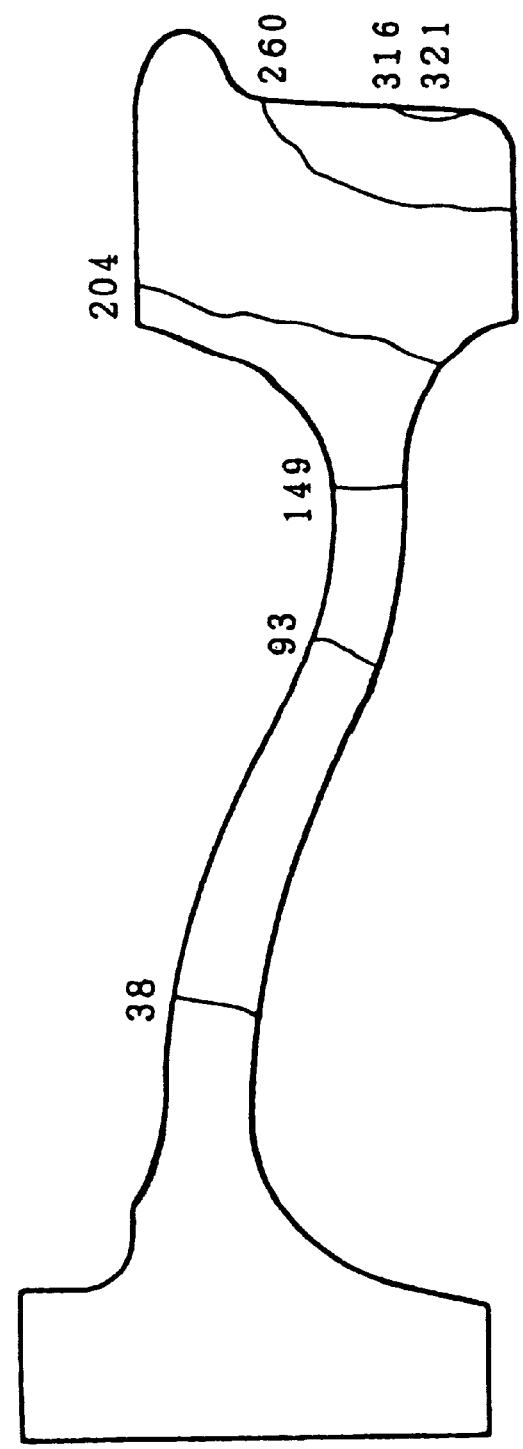
FIG. 7 is a temperature distribution chart when a thermal load is put on the newly manufactured solid rolled wheel according to an embodiment of the present invention.
Figure 8:
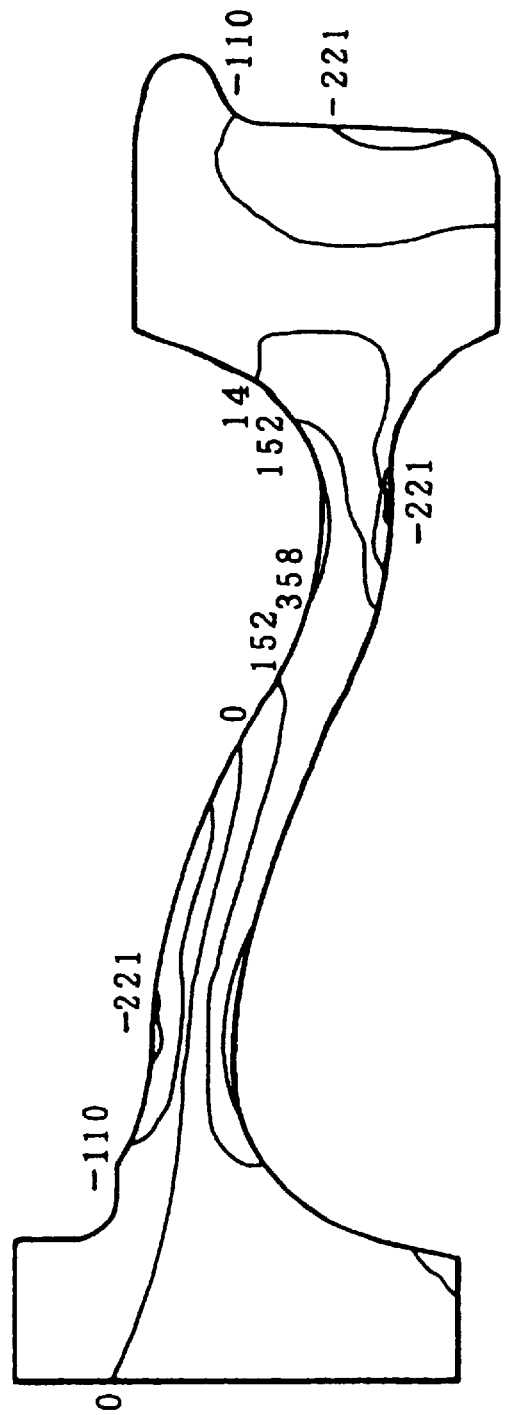
FIG. 8 is a thermal stress distribution chart when a thermal load is put on the newly manufactured solid rolled wheel according to an embodiment of the present invention.
Figure 9:
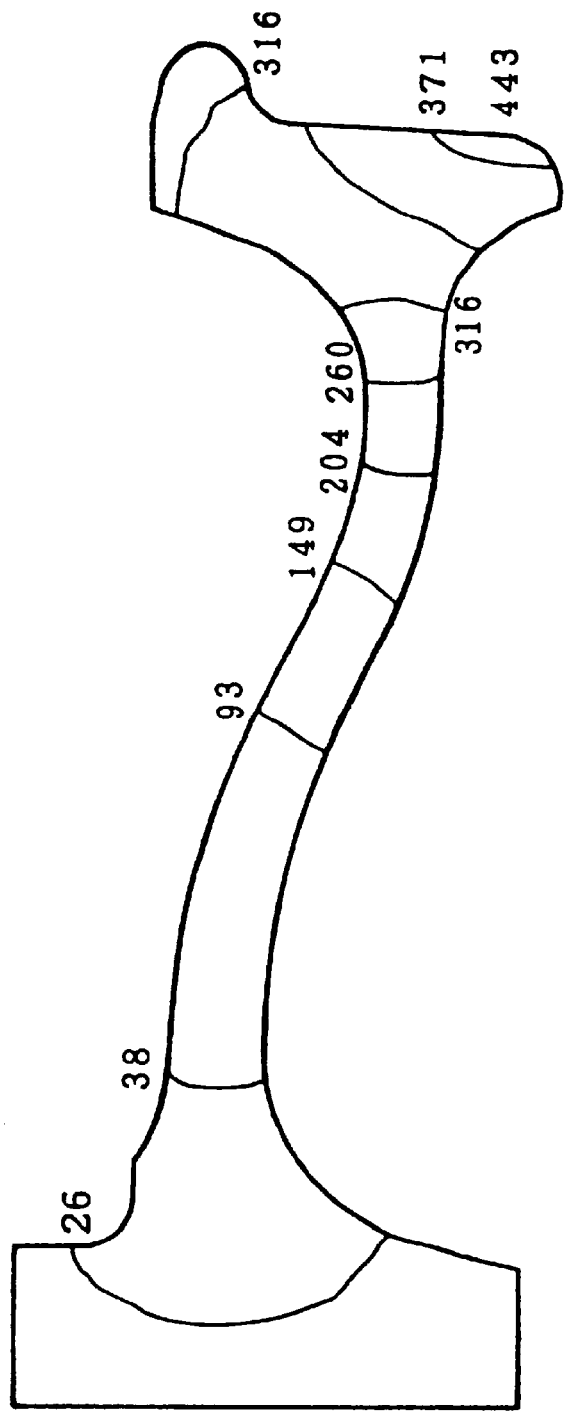
FIG. 9 is a temperature distribution chart when a thermal load is put on the solid rolled wheel in the abrasion limit state according to an embodiment of the present invention.
Figure 10:
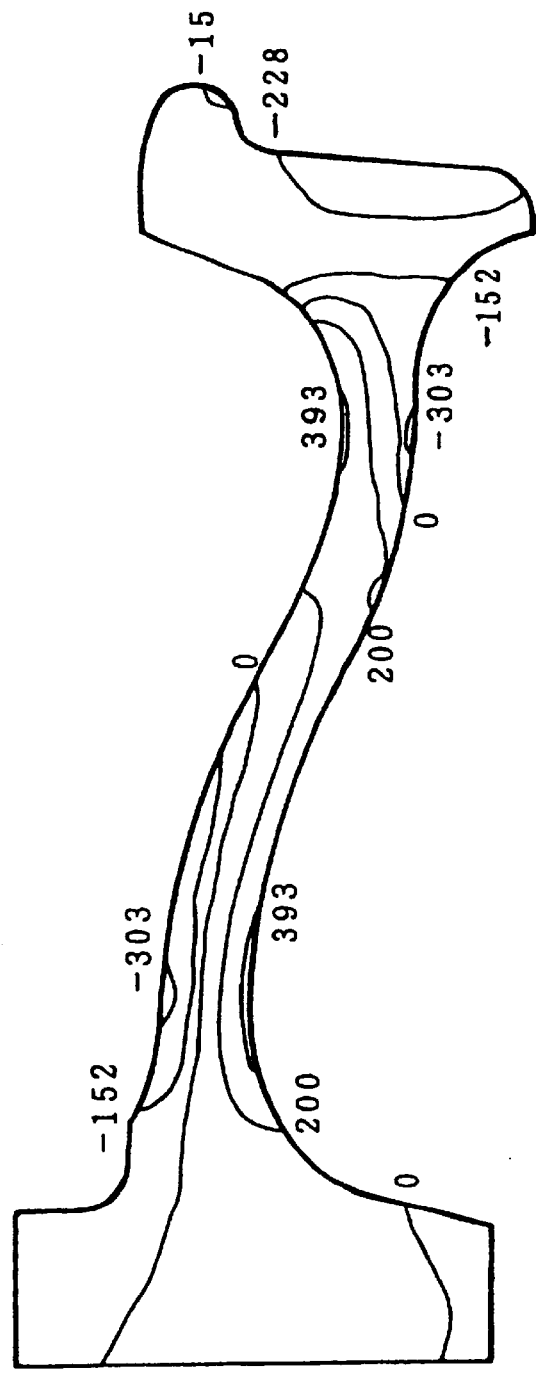
FIG. 10 is a thermal stress distribution chart when a thermal load is put on the solid rolled wheel in the abrasion limit state according to an embodiment of the present invention.

Next, a highest temperature and thermal stress generated in the rim section under the condition of only the thermal load are shown in Table 3. A cross section temperature distribution in the newly manufactured state is shown in FIG. 7 (wheel of the present invention) and FIG. 11 (conventional wheel), a cross section temperature distribution in the abrasion limit state is shown in FIG. 9 (wheel of the present invention) and FIG. 13 (conventional wheel), a thermal stress distribution in the newly manufactured state is shown in FIG. 8 (wheel of the present invention) and FIG. 12 (conventional wheel), and a thermal stress distribution in the abrasion limit state is shown in FIG. 10 (wheel of the present invention) and FIG. 14 (conventional wheel). These are evaluations of influences due to a heat of the rim section generated at the time of braking the tread.

Figure 12:
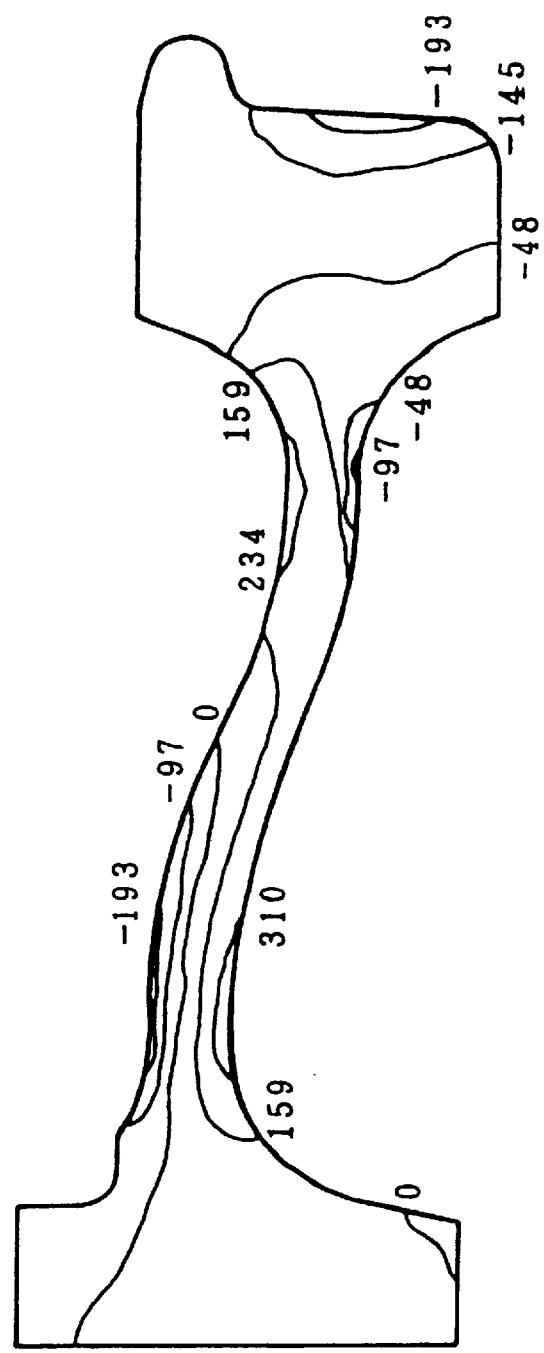
FIG. 12 is a thermal stress distribution chart when a thermal load is put on the newly manufactured solid rolled wheel according to a conventional manufacturing method.
Figure 14:
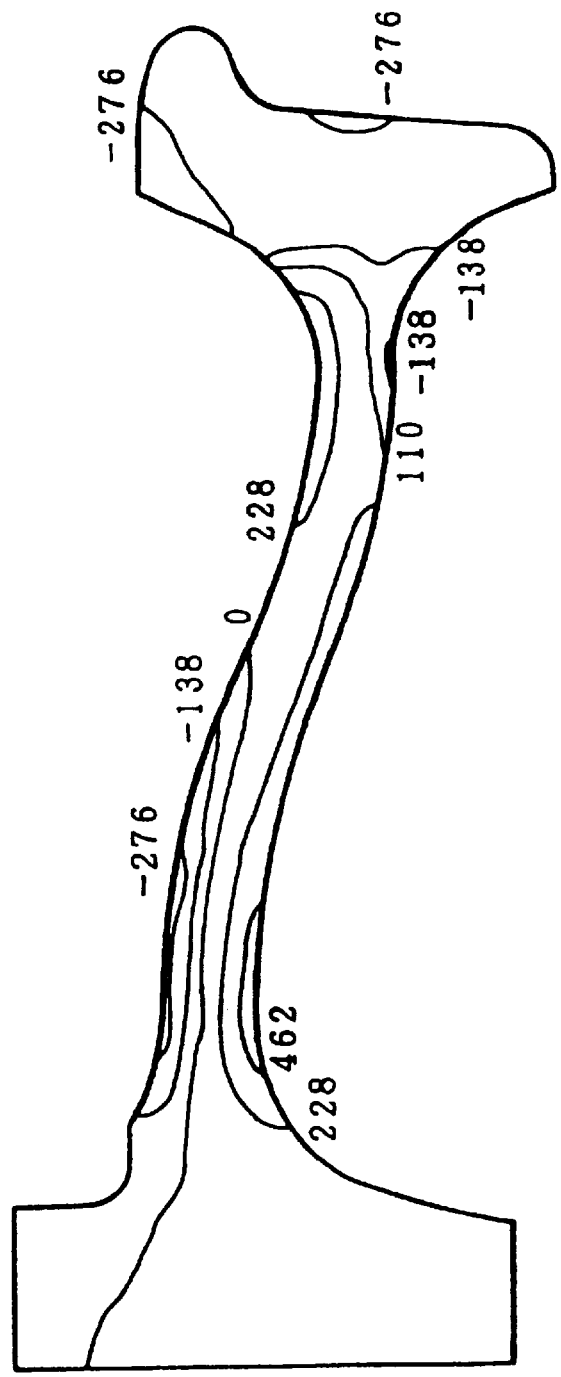
FIG. 14 is a thermal stress distribution chart when a thermal load is put on the solid rolled wheel in the abrasion limit state according to a conventional manufacturing method.

The absolute value of the compressive stress generated in the rim section when the temperature rises are equivalent to each other in the wheel of the present invention and the conventional wheel in the newly manufactured state (FIG. 8 shows the wheel of the present invention, and FIG. 12 shows the conventional wheel), but in the abrasion limit state, the absolute value in the present invention is lower than that in the conventional wheel (FIG. 10 shows the present invention, and FIG. 14 shows the conventional wheel). Therefore, it is found that the durability against cracking damage of the wheel of the present invention is improved. The wheel is usually subject to a tread heat treatment in the rim section, and a residual compressive stress is loaded to the rim section. As a result, a minute crack, which is generated on the tread due to repetition of braking and is generally unavoidable, is prevented from improving. As mentioned above, by reducing the maximum stress generated in the rim section, plastic deformation of the rim section can be prevented, and the occurrence of the residual tension stress in the rim section which causes an improvement of a crack and a cracking damage can be prevented from happening.

As mentioned above, according to the present invention, a wheel for rolling stock having the high fatigue safety factor and excellent durability against cracking damage for the wheel disk can be obtained, and thus a moving safety can be secured in the use under a strict condition due to a congested train schedule or high speed movement of a train.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| Items | | Wheel of the present invention | Comparative wheel |
|---|---|---|---|
| (1) Analyzing form | Type | New φ1143 mm | Comparing φ1143 mm |
| | Rim state | ① Newly manufactured form ② Abrasion limit form (Rim thickness: 25.4 mm) φ1041 mm | φ1041 mm |
| (2) Load | Maximum static load | 17 t | 17 t |
| | Normal load (V) | 34 t | 34 t |
| | Lateral load (L) | 17 t | 17 t |
| (3) Braking condition | | 29.4 kw (20 minutes) | 29.4 kw (20 minutes) |
| (4) Load com- | | a. $V_2$ b. $L_1 + V_1$ | |

TABLE 1-continued

| Items | | Wheel of the present invention | Comparative wheel |
|---|---|---|---|
| bina-<br>tion | c.<br>d.<br>e. | Th<br>$L_1 + V_1 + Th$<br>$V_2 + Th$ | |
| (5) Mate-<br>rial<br>chara-<br>cter-<br>istics<br>and<br>others<br><br>(Boundary<br>condition) | a.<br>b.<br>c.<br><br>d.<br><br><br>e.<br><br>f.<br>g.<br>h.<br>i. | Initial temperature: 24° C.<br>Consistency: 7.83 g/cm³<br>Specific heat: linear function:<br>  Cp = 0.434 + 0.000392T (kJ/kg · K)<br>Heat conductivity: linear<br>function<br>  K = 0.0483 − 0.0000187T<br>  (W/mm · K)<br>Heat transmissibility:<br>constant:<br>  h = 2.27 × 10⁻⁵ (W/mm² · K)<br>Radiant heat: none<br>Elastic modulus: 200,000 (MPa)<br>Poisson's ratio: 0.30<br>Thermal expansion coefficient:<br>linear function:<br>  a = 10.65 + 0.00648T (μm/mK) | |

TABLE 2

| | | | Maximum stress in the plate section | | | | |
|---|---|---|---|---|---|---|---|
| Section | Rim form | | $V_1 + L_1$ | $V_2$ | Th | $V_2 + Th$ | $V_1 + L_1 + Th$ |
| Wheel of the present invention | Newly manufac- tured | kgf/mm²<br>MPa<br>Position | −17.4<br>−170.3<br>P(0°) | −8.7<br>−85.5<br>Q(0°) | 32.2<br>315.8<br>R(0°) | 36.3<br>355.8<br>Q(180°) | 39.7<br>389.6<br>Q(0°) |
| | Abrasion limit | kgf/mm²<br>MPa<br>Position | −21.9<br>−214.4<br>P(0°) | −23.2<br>−227.5<br>S(0°) | 47.8<br>468.9<br>Q(0°) | 52.2<br>511.6<br>Q(90°) | 56.3<br>552.3<br>Q(0°) |
| Com- parative wheel | Newly manufac- tured | kgf/mm²<br>MPa<br>Position | −13.7<br>−134.5<br>P(0°) | −9.8<br>−96.5<br>Q(0°) | 38.6<br>378.5<br>Q(0°) | 44.1<br>432.3<br>Q(180°) | 44.7<br>438.5<br>Q(0°) |
| | Abrasion limit | kgf/mm²<br>MPa<br>Position | −24.7<br>−242.7<br>R(0°) | −24.0<br>−235.1<br>S(0°) | 81.4<br>798.4<br>Q(0°) | 95.3<br>934.3<br>Q(0°) | 92.9<br>911.5<br>Q(0°) |

TABLE 3

Figure 11:
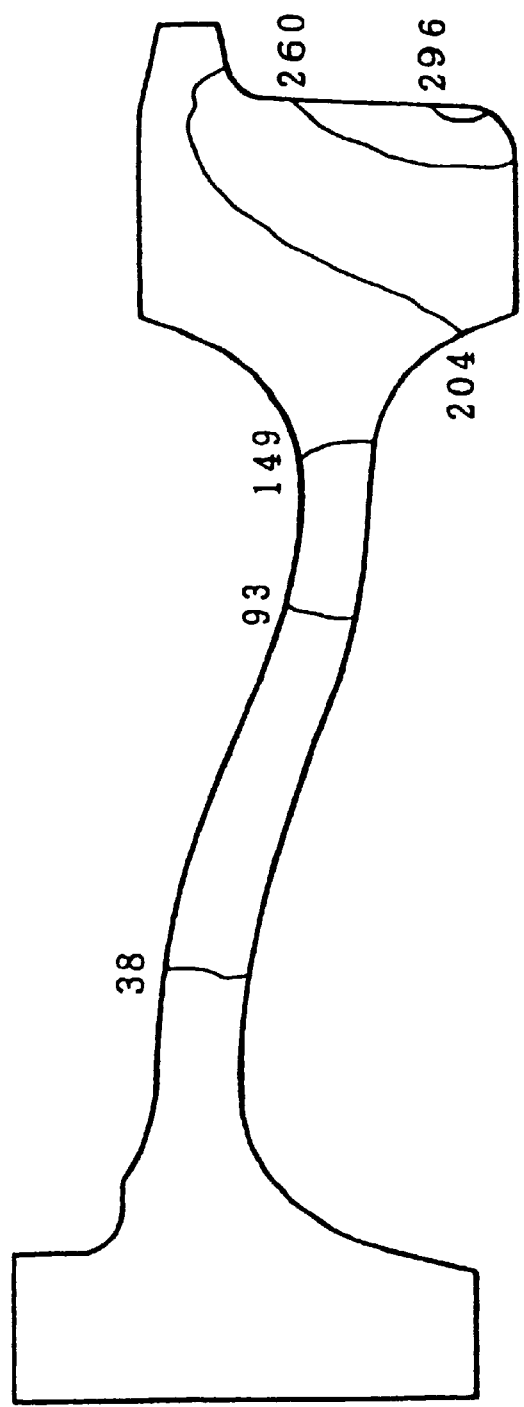
FIG. 11 is a temperature distribution chart when a thermal load is put on the newly manufactured solid rolled wheel according to a conventional manufacturing method.
Figure 13:
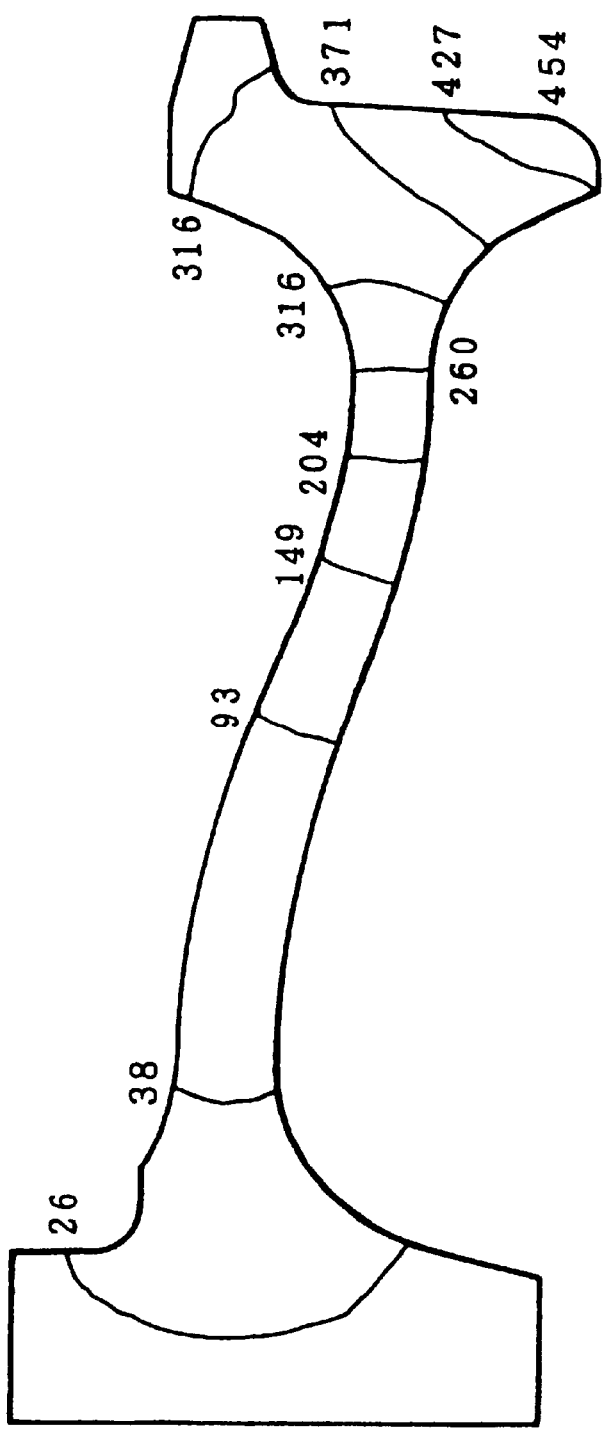
FIG. 13 is a temperature distribution chart when a thermal load is put on the solid rolled wheel in the abrasion limit state according to a conventional manufacturing method.

| | | | | Maximum stress on the surface of the rim section | | | |
|---|---|---|---|---|---|---|---|
| Section | Rim form | Tread maximum temperature | | Tread | Rim surface on the side closer to the flange | Rim surface on the side opposed to the flange | Flange |
| Wheel of the present inven- tion | Newly manufac- tured | (° C.) 300<br>(° F.) 572<br>FIG. 7 | kgf/mm²<br>MPa | −21.6<br>−211.7 | −9.7<br>−95.1<br>FIG. 8 | −19.58<br>−191.0 | −12.4<br>−121.3 |
| | Abrasion limit | (° C.) 413<br>(° F.) 775<br>FIG. 9 | kgf/mm²<br>MPa | −29.1<br>−285.4 | −21.7<br>−213.1<br>FIG. 10 | −26.7<br>−262.0 | −20.6<br>202.0 |
| Compar- ative wheel | Newly manufac- tured | (° C.) 302<br>(° F.) 575<br>FIG. 11 | kgf/mm²<br>MPa | −21.1<br>−206.8 | −14.1<br>−137.9<br>FIG. 12 | −17.1<br>−167.5 | −14.3<br>−140.7 |
| | Abrasion limit | (° C.) 416<br>(° F.) 780<br>FIG. 13 | kgf/mm²<br>MPa | −41.0<br>−402.0 | −44.6<br>−437.1<br>FIG. 14 | −31.1<br>−305.4 | −40.0<br>−392.3 |

We claim:

1. A wheel for rolling stock, comprising:
   a boss section adapted to be fitted on a wheel set;
   a disk formed on a circumference of said boss section; and
   a rim section, on an outer circumferential end of said disk, which is deflected to one side of an axial direction from said boss section,
   wherein said disk is deflected to one side in the axial direction from said rim section so that a condition that $\lambda \geq 5$ mm is satisfied where $\lambda$ is a deflection amount which is an axial direction distance between a center of a thickness in the axial direction of said rim section and a center of a thickness in the axial direction of an end of said disk closer to said rim section.

2. The wheel for rolling stock according to claim 1, wherein said rim section is deflected from said boss section so that a condition that $\delta \geq 40$ mm is satisfied where $\delta$ is a deflection amount which is an axial direction distance between a center of a thickness in the axial direction of an end of said disk closer to said rim section and a center of a thickness in the axial direction of an end of said disk closer to said boss section.

3. The wheel for rolling stock according to claim 1, wherein said disk is provided with a fillet at an end thereof closer to said rim section, and the deflection amount $\lambda$ is an axial direction distance between the center of the thickness of said rim section and a center of the thickness of said disk in the vicinity of the end of a curved line farther away from said rim section on said fillet.

4. The wheel for rolling stock according to claim 3, wherein said disk is provided with a fillet at an end thereof closer to said boss section, the deflection amount δ is an axial direction distance between a center of the thickness of said disk in the vicinity of the end of a curved line farther away from said rim section on said fillet closer to said rim section and a center of the thickness of said disk in the vicinity of the end of a curved line farther away from said boss section on said fillet closer to said boss section.

5. A method of manufacturing a wheel for rolling stock, comprising the steps of:

forming a boss section to be fitted on a wheel set, a disk formed on a circumference of said boss section and a rim section on an outer circumferential end of said disk by preforging;

providing a fillet to an end of said disk closer to said rim section by rolling so that V, $R_1$ and $R_2$ become predetermined values wherein V is a volume of said disk from an inner circumferential surface of said rim section to the end of a curved line of the fillet after the rolling, $R_1$ is a curvature of a curved line on one axial side of said fillet after rolling, and $R_2$ is a curvature of a curved line on the other axial side of said fillet after the rolling; and deforming said disk by rotational forging so that conditions:

$V=W$ $R_1=R_3$, $R_2>R_4$ are satisfied where:

W: a volume of said disk from the inner circumferential surface of said rim section to the end of a curved line of the fillet after the rotary forging;

$R_3$: a curvature of a curved line on said one axial side of said fillet after the rotary forging; and $R_4$: a curvature of a curved line on the other axial side of said fillet after the rotary forging.

* * * * *